United States Patent [19]

Taubitz et al.

[11] Patent Number: 4,959,415

[45] Date of Patent: Sep. 25, 1990

[54] THERMOPLASTIC MOLDING MATERIALS BASED ON POLYPHENYLENE ETHERS, NYLONS AND STYRENE COPOLYMERS

[75] Inventors: Christof Taubitz, Wachenheim; Erhard Seiler, Ludwigshafen; Juergen Hambrecht, Muenster-Hiltrup; Konrad Mitulla, Ludwigshafen; Klaus Boehlke, Hessheim, all of Fed. Rep. of Germany

[73] Assignee: Basf Aktiengesellschaft, Ludwigshafen, Fed. Rep. of Germany

[21] Appl. No.: 179,991

[22] Filed: Apr. 11, 1988

Related U.S. Application Data

[62] Division of Ser. No. 2,237, Jan. 12, 1987, abandoned.

[30] Foreign Application Priority Data

Jan. 21, 1986 [DE] Fed. Rep. of Germany ....... 3601581
Jun. 7, 1986 [DE] Fed. Rep. of Germany ....... 3619224

[51] Int. Cl.$^5$ .............................................. C08L 71/04
[52] U.S. Cl. .................................... 525/133; 525/151; 525/92; 525/905
[58] Field of Search ............... 525/133, 151, 179, 178, 525/92, 905

[56] References Cited

U.S. PATENT DOCUMENTS 4,339,376 7/1982 Kasahara et al. .................. 525/133

Primary Examiner—Ana L. Carrillo
Attorney, Agent, or Firm—Oblon, Spivak, McClelland, Maier & Neustadt

[57] ABSTRACT

Thermoplastic molding materials containing (A) not less than 5% by weight of a polyphenylene ether and
(B) not less than 5% by weight of a nylon furthermore contain
(C) not less than 0.1% by weight of a copolymer composed of
(C$_1$) not less than 30% by weight of a styrene of the general formula I

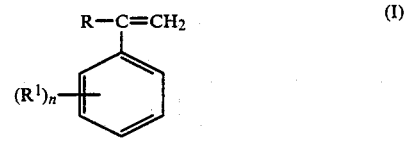

where R and R$^1$ are alkyl of 1 to 8 carbon atoms, hydrogen and/or halogen and n is 0, 1, 2 or 3,
(C$_2$) not less than 0.5% by weight of an epoxide-containing polymerizable monomer and/or
(C$_3$) not less than 0.05% by weight of a halobenzyl-containing polymerizable monomer possessing a structural unit (II)

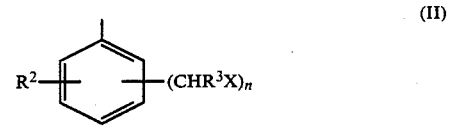

where X is halogen, R$^2$ and R$^3$ are each alkyl of 1 to 8 carbon atoms or hydrogen and n is 1, 2 or 3, and/or
(C$_4$) not less than 0.05% by weight of a polymerizable monomer containing oxazoline groups and
(C$_5$) from 0 to 20% by weight of acrylonitrile, methacrylonitrile and/or other nonionic comonomers, and
(D) from 0 to 35% by weight of a toughened rubber, and possess particularly good impact strength.

5 Claims, No Drawings

THERMOPLASTIC MOLDING MATERIALS BASED ON POLYPHENYLENE ETHERS, NYLONS AND STYRENE COPOLYMERS

This application is a division of U.S. application Ser. No. 07/002,237, filed Jan. 12, 1987 and now abandoned.

The present invention relates to thermoplastic molding materials containing (A) not less than 5% by weight of a polyphenylene ether and (B) not less than 5% by weight of a nylon.

The present invention furthermore relates to moldings which contain these molding materials as the essential component.

Polyphenylene ethers have excellent thermal, mechanical and dielectric properties but are difficult to process in pure form. Blends of polyphenylene ethers and styrene polymers are also known; however, they have the disadvantage that their resistance to solvents is very low. This very greatly restricts their range of uses.

US-A 3,379,792 furthermore discloses that the melt flow properties of polyphenylene ethers can be improved by adding a small amount of nylon. However, this publication furthermore states that, when more than 20% by weight of nylon is added, other properties of the polyphenylene ether are very adversely affected.

GB-A-2,054,623 furthermore discloses molding materials of polyphenylene ethers and very large proportions of nylons. However, a relatively long mixing process at the melting point is necessary in order to prepare these molding materials. Prolonged mixing at the melting point readily gives rise to degradation.

EP-A-24,120 describes blends of polyphenylene ethers and nylons, which contain a liquid diene polymer and/or a compound possessing a carbon-carbon double bond and a carboxylic acid radical and/or an epoxide compound. The stated epoxide compounds are epoxy resins prepared by condensation of polyhydric alcohols or phenols and epichlorohydrin, or are glycidyl derivatives of amino compounds or epoxidized products of a higher olefin or of a cycloalkene. Although molding materials prepared in this manner have better mechanical properties, cleavage of the layers (delamination) is observed in the moldings.

It is an object of the present invention to provide thermoplastic molding materials which possess not only good processability but also good thermal, mechanical and dielectric properties and in particular high impact strength and good resistance to solvents, without delamination processes occurring.

We have found that this object is achieved, according to the invention, by thermoplastic molding materials containing (A) not less than 5% by weight of a polyphenylene ether and (B) not less than 5% by weight of a nylon, which contain (C) not less than 0.1% by weight of a copolymer composed of ($C_1$) not less than 30% by weight of a styrene of the general formula I

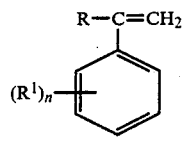

where R and $R^1$ are alkyl of 1 to 8 carbon atoms, hydrogen and/or halogen and n is 0, 1, 2 or 3, ($C_2$) not less than 0.5% by weight of an epoxide-containing polymerizable monomer and/or ($C_3$) not less than 0.05% by weight of a halobenzyl-containing polymerizable monomer possessing a structural unit (II)

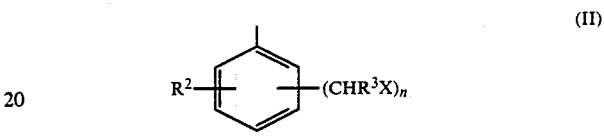

where X is halogen, $R^2$ and $R^3$ are each alkyl of 1 to 8 carbon atoms or hydrogen and n is 1, 2 or 3, and/or ($C_4$) not less than 0.05% by weight of a polymerizable monomer containing oxazoline groups and ($C_5$) from 0 to 20% by weight of acrylonitrile, methacrylonitrile and/or other nonionic comonomers, and (D) from 0 to 35% by weight of a toughened rubber.

Preferred materials of this type are described in the subclaims.

The novel thermoplastic molding materials have the advantage that they are readily processable and have good mechanical properties and high impact strength and resistance to solvents. Furthermore, no delamination is observed in the moldings produced from them.

The advantageous properties of the novel molding materials are in contradiction to the generally held view that, in blends of a polyethylene ether and nylon, there is no compatibility between the two plastics because phase separation generally occurs during molding of such blends, as stated in, for example, German Laid-Open Application DOS 3,027,104.

The polyphenylene ethers A) present in the novel molding materials are known per se. They are compounds based on substituted, in particular disubstituted, polyphenylene oxides, the ether oxygen of one unit being bonded to the benzene nucleus of the adjacent unit. Polyphenylene oxides which are substituted in the 2- and/or 6-position with respect to the oxygen atom are preferably used, not less than 50 units advantageously being bonded to one another. Examples of substituents are halogen, such as chlorine or bromine, and alkyl of 1 to 4 carbon atoms which preferably does not possess a tertiary hydrogen atom in the α-position, e.g. methyl, ethyl, propyl or butyl. The alkyl radicals may in turn be substituted by halogen, such as chlorine or bromine, or by hydroxyl. Further examples of possible substituents are alkoxy, preferably of not more than 4 carbon atoms, and phenyl which is unsubstituted or substituted by halogen and/or alkyl. Copolymers of various phenols, for example copolymers of 2,6-dimethylphenol and 2,3,6-trimethylphenol, are also suitable. It is of course also possible to use mixtures of various polyphenylene ethers.

Examples of polyphenylene ethers are poly-(2,5-dilauryl-1,4-phenylene) oxide, poly-(diphenyl-1,4-phenylene) oxide, poly-(2,6-dimethoxy-1,4-phenylene) oxide, poly-(2,6-diethoxy-1,4-phenylene) oxide, poly-(2-methoxy-6-ethoxy-1,4-phenylene) oxide, poly-(2-ethyl-6-stearyloxy-1,4-phenylene) oxide, poly-(2,6-dichloro-1,4-phenylene) oxide, poly-(2-methyl-6-phenyl-1,4-phenylene) oxide, poly-(2,6-dibenzyl-1,4-phenylene) oxide, poly-(2-ethoxy-1,4-phenylene) oxide, poly-(2-chloro-1,4-phenylene) oxide and poly-(2,5-dibromo-1,4-phenylene) oxide. Preferably used polyphenylene ethers are those in which the substituents are alkyl of 1 to 4 carbon atoms, eg. poly-(2,6-dimethyl-1,4-phenylene) oxide, poly-(2,6-diethyl-1,4-phenylene) oxide, poly-(2-methyl-6-ethyl-1,4-phenylene) oxide, poly-(2-methyl-6-propyl-1,4-phenylene) oxide, poly-(2,6-dipropyl-1,4-phenylene) oxide and poly-(2-ethyl-6-propyl-1,4-phenylene) oxide.

Regarding their physical properties, preferred polyphenylene ethers are those which have an intrinsic viscosity of from 0.4 to 0.7 dl/g, measured in chloroform at 30° C.

The amount of polyphenylene ether in the novel molding materials is not critical but is not less than 5, preferably from 10 to 89, % by weight, based on the total weight of components (A)-(D). Particularly preferred molding materials are those which contain from 20 to 70, in particular from 35 to 60, % by weight of polyphenylene ether.

Some of the polyphenylene ethers used as component (A) may be replaced with styrene polymers. Preferably, up to half the amount of polyphenylene ether is replaced with such styrene polymers. Examples of styrene polymers of this type are polystyrene, poly-α-methylstyrene and poly-p-methylstyrene, polystyrene being preferred. Styrene polymers which are prepared in the presence of from 2 to 20% by weight of an elastomeric polymer are also preferred. Rubber-like polymers based on butadiene, eg. styrene/butadiene polymers, polybutadiene and butadiene/styrene block copolymers are suitable. Where styrene/diene block copolymers are used, it has proven advantageous to replace up to 20% of the content of polyphenylene oxide with butadiene/styrene or isoprene/styrene block copolymers or their hydrogenated products.

The novel molding materials contain one or more thermoplastic nylons as component (B). Although there are no particular restrictions with regard to the structure of the nylons, preferred nylons are those derived from lactams having 7 to 13 ring members, eg. polycaprolactam, polycapryllactam or polylaurolactam, and nylons obtained by reacting dicarboxylic acids with diamines. Examples of dicarboxylic acids, which may also be used in combinations, are alkanedicarboxylic acids of 6 to 12, in particular 6 to 10, carbon atoms, and terephthalic and isophthalic acid. Examples of diamines, which likewise may be used in combinations, are alkanediamines of 6 to 12, in particular 6 to 8, carbon atoms, as well as m-xylylenediamine, bis-(4-aminophenyl)-methane, bis-(4-aminocyclohexyl)-methane and 2,2-bis-(4-aminophenyl)-propane. Mixtures of nylons prepared in this manner may also be used. Industrially, polycaprolactam and polyhexamethylenesebacamide and nylons synthesized from hexamethylenediamine and isophthalic acid and/or terephthalic acid have become relatively important.

Although there are likewise no special restrictions with regard to the physical properties, linear nylons having a relative viscosity of from 2.2 to 4.5, measured on a 1% strength by weight solution in 96% pure sulfuric acid at 23° C., are preferred.

Like component (A), the amount of component (B) in the novel molding materials is not subject to any particular restriction, although in this case too not less than 5, preferably from 10 to 89, % by weight, based on (A) to (C), of the nylon are used. Particularly preferred molding materials contain from 15 to 70% by weight of a known plastic nylon, while very particularly preferred molding materials contain from 25 to 60% by weight of the said nylon. All percentages are based on the total weight of components (A) to (D).

The novel molding materials contain, as a further component, not less than 0.1% by weight of a copolymer (C) of (C₁) not less than 30% by weight of a styrene of the general formula I

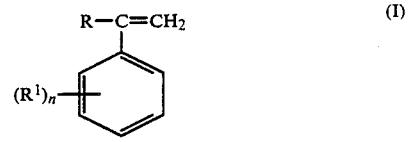

R and R¹ are alkyl of 1 to 8 carbon atoms, hydrogen and/or halogen and n is 0, 1, 2 or 3, (C₂) not less than 0.5% by weight of an epoxide-containing polymerizable monomer and/or (C₃) not less than 0.05% by weight of a halobenzyl-containing polymerizable monomer possessing a structural unit (II)

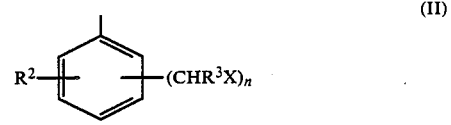

where X is halogen, R² and R³ are each alkyl of 1 to 8 carbon atoms or hydrogen and n is 1, 2 or 3, and/or (C⁴) not less than 0.05% by weight of a polymerizable monomer containing oxazoline groups and (C⁵) from 0 to 20% by weight of acrylonitrile, methacrylonitrile and/or other nonionic comonomers.

The monomers carrying epoxide, halobenzyl or oxazoline groups improve the adhesion between components (A) and (B) and thus effect an overall improvement in the properties of molding materials prepared from these components. The adhesion-improving effect is presumably based on an interaction of the epoxide, halobenzyl and/or oxazoline groups with components A) and B). Whether this interaction results in the formation of covalent bonds or is a physical interaction cannot yet be stated with certainty.

As stated above, component C) contains not less than 30, preferably not less than 80, % by weight of styrene and/or substituted styrenes (C₁) of the general formula I. In addition, up to 20% by weight of acrylonitrile and/or methacrylonitrile and other nonionic comonomers C₅ may be present. However, copolymers which do not contain C₅ are preferred.

Among the substituted styrenes of the general formula I, -methylstyrene and p-methylstyrene are particularly preferred, although, for example, the various ethylstyrenes and chlorostyrenes (m-, o- and p-), to mention but a few, are also suitable.

Suitable epoxide-containing monomers C1 are in principle any compounds which possess an epoxide group in the molecule. However, preferably used monomers are those which carry glycidyl groups, in particular glycidyl acrylate and glycidyl methacrylate. Glycidyl derivatives of other acids and glycidyl allyl ether and glycidyl vinyl ether are also useful. These generally contain the typical structural unit

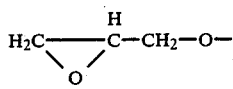

in the molecule.

Where epoxide-containing monomers are used, the copolymers C) preferably contain from 80 to 99.5, particularly preferably from 90 to 98, % by weight of styrene and/or substituted styrenes and from 0.5 to 20, particularly preferably from 2 to 10, % by weight of epoxide-containing monomers. The amount of other copolymerizable monomers, where these are used, is preferably not more than 10, particularly preferably less than 8, % by weight.

The molecular weight of the epoxide-containing copolymers (C) is in general from 20,000 to 1,000,000, preferably from 40,000 to 250,000.

In a further embodiment, a copolymer synthesized from styrene and/or substituted styrenes (I) and monomers carrying halobenzyl groups is used as copolymer (C). Halobenzyl groups in these monomers are listed below as being a structural unit

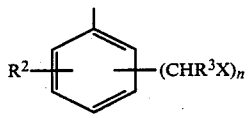

(II)

where X is halogen, preferably chlorine or bromine, in particular chlorine, n is 1, 2 or 3 and $R^2$ and $R^3$ are each alkyl of 1 to 8 carbon atoms or hydrogen. The halobenzyl groups are preferably introduced by means of chloromethylvinylbenzene (meta or para isomers or mixtures of these). As in the case of the epoxide-containing compounds, however, only the halobenzyl group as such is critical, so that in principle any compound which contains the structural unit and is copolymerizable with ($C_1$) is suitable.

Regarding the substituted styrenes used and their possible partial replacement with other monomers, the statements made above in connection with the epoxide-containing copolymers are applicable.

In a particularly preferred embodiment, copolymer (C) is composed of from 80 to 99.5, particularly preferably from 95 to 99.5, % by weight of styrene and/or substituted styrene and from 0.05 to 20, particularly preferably from 0.5 to 5, % by weight of the halobenzyl-carrying monomer. Where they are present, the amount of other copolymerizable monomers can be up to 10% by weight.

As a rule, the halobenzyl-containing copolymers (C) have a molecular weight of from 5,000 to 1,000,000, preferably from 20,000 to 250,000, particularly preferably from 40,000 to 200,000.

In another embodiment, copolymer (C) contains one or more oxazoline-containing polymerizable monomers as component (C4).

These monomers are preferably of the general formula II

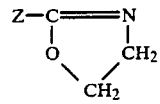

where Z contains a polymerizable double bond.
Preferred substitutents Z are

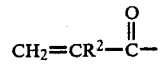

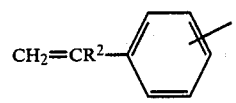

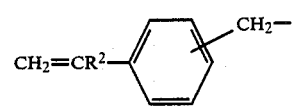

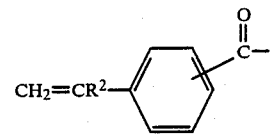

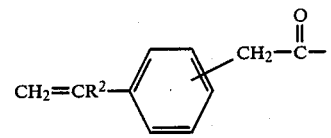

and

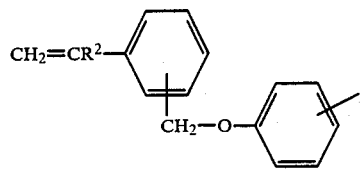

where $R^2$ is hydrogen or alkyl or alkoxy, each of 1 to 6 carbon atoms, eg. methyl, isopropyl, n-propyl or butyl, to mention but a few.

Particularly preferred monomers (C4) are vinyloxazolines of the general formula III

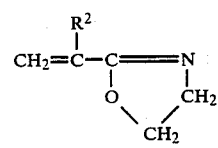

where $R^2$ has the above meanings and is preferably hydrogen or methyl.

The copolymers used according to the invention can be prepared in a conventional manner by mass, solution, emulsion or suspension copolymerization, either continuously or batchwise. The monomers are preferably polymerized in a suitable solvent, e.g. ethylbenzene. In a particularly preferred embodiment, the monomers, e.g. styrene and chloromethylvinylbenzene, are polymerized continuously at from 120° to 150° C. under superatmospheric pressure using a free radical initiator or by thermal polymerization, i.e. without initiator.

Component (C) may also be toughened. Such polymers are known generally to the skilled worker as high impact polystyrene, or the corresponding styrene derivatives. The polymers are prepared in the presence of a rubber which imparts impact strength or are mixed with grafted rubbers. Examples of rubber-like polymers are butadiene, styrene/butadiene, styrene-b-butadiene, acrylonitrile/butadiene, ethylene/propylene, polyacrylate and polyisoprene rubbers. (C) is preferably not toughened. These components can be used in ungrafted form for toughening component (A).

In this case, rubber (D) which imparts impact strength can be added in addition to components (A) and (B). Examples of this are polybutadine rubber, acrylate rubber, styrene/butadiene rubber, polybutadiene rubber, hydrogenated styrene/butadiene rubbers, acrylonitrile/butadiene rubber, ethylene/propylene rubber, polyisoprene rubber, styrene-grafted ethylene/propylene rubbers, thermoplastic ethylene/propylene rubbers, thermoplastic polyester elastomers, ethylene rubbers and ionomers, styrene/butadiene block copolymers, eg. AB, ABA, ABA tapering and star block copolymers and similar isoprene block copolymers, and hydrogenated or partially hydrogenated block copolymers. Among these, block copolymers which contain styrene and butadiene are preferred.

The amount of rubber (D) which imparts impact strength is not critical. In general, however, it is not more than 35, preferably from 4 to 20, % by weight, based on the total weight of components (A) to (D).

The novel thermoplastic molding materials may contain, as further components, conventional additives and processing assistants in effective amounts. The amount of these is preferably not more than 40, particularly preferably not more than 20, % by weight. Heat stabilizers, light stabilizers, lubricants, mold release agents, colorants, such as dyes and pigments, reinforcing agents, such as glass fibers, asbestos fibers, carbon fibers or aromatic polyamide fibers, and/or fillers, such as gypsum fibers, synthetic calcium silicates, kaolin, calcined kaolin, wollastonite, talc or chalk, and flame-proofing agents, such as inorganic and organic phosphorus compounds, may be mentioned merely by way of example. Other low molecular weight or high molecular weight polymers may also be present as additives in the molding materials according to the invention.

The novel thermoplastic molding materials are advantageously prepared by mixing the components at from 250° to 320° C. in a conventional mixing apparatus, e.g. a kneader, a Banbury mixer or a single-screw extruder, preferably in a twin-screw extruder. In order to obtain a very homogeneous molding material, thorough mixing is necessary. The order in which the components are mixed can be varied; two or, if desired, three components may be premixed, or all components can be mixed together.

The novel thermoplastic molding materials can be converted to moldings having good mechanical properties by injection molding or extrusion.

Unless stated otherwise, all percentages are by weight.

EXAMPLE 1

Molding materials according to the invention were prepared using the following components:

Component A

Poly-(2,6-dimethyl-1,4-phenylene) ether having a relative viscosity of 0.61 (measured in chloroform at 30° C.)

Compound B $B_1$ Polycaprolactam having a relative viscosity of 3.2 and $B_2$ Polycaprolactam having a relative viscosity of 3.9, measured in each case on a solution containing 1% by weight in 96% pure sulfuric acid at 23° C.

Rubber (D) for increasing the impact-strength

Styrene/butadiene/styrene block copolymer prepared by anionic polymerization and containing 32% by weight of styrene and 68% by weight of butadiene and having a weight average molecular weight $\overline{M}_w$ of 110,000.

Component C $C_1$ styrene/chloromethylstyrene copolymer (95% by weight of styrene, 3% by weight of m-chloromethylstyrene and 2% by weight of p-chloromethylstyrene), prepared by continuous solution polymerization at 135° C. for a residence time of 6 hours; weight average molecular weight $\overline{M}_w = 80,000$.

$C_2$ styrene/chloromethylstyrene copolymer (97% by weight of styrene, 2% by weight of m-chloromethylstyrene and 1% by weight of p-chloromethylstyrene), prepared similarly to component $C_1$, but having a weight average molecular weight $\overline{M}_w$ of 55,000.

The polymers were mixed in a twin-screw extruder (Werner & Pfleiderer) at 280° C., the resulting molding material was granulated and the granules were converted to moldings by injection molding. None of the samples according to the invention exhibited separation of the layers (delamination), which occurred in the case of the comparative examples.

The results of the impact strength and notched impact strength measurements are shown in Table 1.

TABLE 1

| Experiment No. | Percentage by weight A | B | D[(1)] | C | Impact strength according to DIN 53,453 $kJm^{-2}$ | Notched impact strength according to DIN 53,453 $kJm^{-2}$ |
|---|---|---|---|---|---|---|
| 1* | 50 | 50 $B_1$ | — | — | 10.3 | 1.2 |
| 2 | 47 | 47 $B_1$ | — | 6 $C_1$ | 32.2 | 3.6 |
| 3* | 40 | 60 $B_2$ | — | — | 12.0 | 0.9 |
| 4 | 36 | 55 $B_2$ | — | 9 $C_2$ | 41.0 | 2.6 |
| 5 | 66 | 28 $B_2$ | — | 6 $C_1$ | 32.0 | 3.9 |
| 6 | 48 | 39 $B_2$ | — | 13 $C_1$ | 40.0 | 2.9 |
| 7 | 37 | 56 $B_2$ | — | 7 $C_2$ | 47.0 | 4.6 |
| 8* | 37 | 56 $B_1$ | 7 | — | 16.0 | 1.4 |
| 9 | 34 | 51 $B_1$ | 7 | 8 $C_2$ | 84.0 | 8.1 |
| 10 | 40 | 40 $B_2$ | 10 | 10 $C_2$ | no fracture | 12.4 |

TABLE 1-continued

| Experiment No. | Percentage by weight | | | | Impact strength according to DIN 53,453 $kJm^{-2}$ | Notched impact strength according to DIN 53,453 $kJm^{-2}$ |
|---|---|---|---|---|---|---|
| | A | B | D[1] | C | | |
| 11 | 39 | 51 $B_2$ | 5 | 5 $C_2$ | 73.0 | 9.3 |
| 12* | 40 | 50 $B_2$ | 10 | — | 13.0 | 0.9 |
| 13 | 36 | 44 $B_2$ | 10 | 10 $C_1$ | no fracture | 8.5 |

*Comparative Examples
[1]Rubber for increasing the impact strength

EXAMPLES 14 TO 25

Components (A) to (C) below were used, and molding materials were prepared by mixing the polymers in a twinscrew extruder at 280° C. The molding materials obtained were granulated and the granules were converted to moldings by injection molding.

Component A

As in Example 1.

Component B $B_3$ Polycaprolactam having a relative viscosity of 3.0
$B_2$ Polycaprolactam having a relative viscosity of 4.0, measured in each case on a solution containing 1% by weight in 96% pure sulfuric acid at 23° C.

Rubber for increasing the impact strength (D)

As in Example 1.

Component C $C_3$ Styrene/glycidyl methacrylate copolymer (93% by weight of styrene and 7% by weight of glycidyl methacrylate), prepared by continuous solution polymerization at 140° C. for a residence time of 5 hours; $\overline{M}_w=105,000$.
$C_4$ Styrene/glycidyl methacrylate copolymer (96% by weight of styrene and 4% by weight of glycidyl methacrylate), prepared similarly to $C_3$, but with $\overline{M}_w=75,000$.

The results of the impact strength and notched impact strength measurements according to DIN 53,453 are shown in Table 2.

EXAMPLES 26 to 35

Molding materials according to the invention were prepared using the following components:

Component A

As in Examples 1 to 16.

Component B $B_4$ Polycaprolactam having a relative viscosity of 3.0 and
$B_5$ Polycaprolactam having a relative viscosity of 4.0, measured in each case on a solution containing 1% by weight in 96% pure sulfuric acid at 23° C.

Rubber (D) for increasing the impact strength (Component D)

Styrene/butadiene/styrene block copolymer prepared by anionic polymerization and containing 32% by weight of styrene and 68% by weight of butadiene and having a weight average molecular weight $\overline{M}_w$ of 110,000.

Component C $C_5$: Styrene/vinyloxazoline copolymer (99 mol % of styrene and 1 mol % of vinyloxazoline), having a weight average molecular weight $\overline{M}_w$ of 200,000.

The polymers were mixed in a twin-screw extruder (Werner & Pfleiderer) at 280° C., the resulting molding material was granulated and the granules were converted to moldings by injection moldings. None of the samples according to the invention showed separation of the layers (delamination), whereas this occurred in the case of the comparative examples.

The composition of the individual molding materials and the results of the water absorption and notched impact strength measurements are shown in Table 3.

TABLE 2

| Experiment No. | Percentage by weight | | | | Impact strength according to DIN 53,453 $kJm^{-2}$ | Notched impact strength according to DIN 53,453 $kJm^{-2}$ |
|---|---|---|---|---|---|---|
| | A | B | D | C | | |
| 14* | 40 | 60 $B_3$ | — | — | 12.2 | 0.8 |
| 15 | 36 | 55 $B_3$ | — | 9 $C_3$ | 28.2 | 3.4 |
| 16* | 50 | 50 $B_2$ | — | — | 10.4 | 0.9 |
| 17 | 43 | 48 $B_2$ | — | 9 $C_4$ | 32.1 | 4.6 |
| 18 | 37 | 50 $B_2$ | — | 13 $C_3$ | 41.1 | 4.7 |
| 19 | 37 | 56 $B_3$ | — | 7 $C_4$ | 22.5 | 3.4 |
| 20 | 35 | 52 $B_2$ | — | 13 $C_4$ | 46.0 | 4.5 |
| 21 | 29 | 54 $B_3$ | — | 17 $C_4$ | 44.0 | 4.9 |
| 22* | 41 | 50 $B_3$ | 9 | — | 19.1 | 1.3 |
| 23 | 37 | 45 $B_3$ | 9 | 9 $C_4$ | 77.1 | 8.9 |
| 24* | 44 | 44 $B_2$ | 12 | — | 17.0 | 1.2 |
| 25 | 40 | 40 $B_2$ | 11 | 9 $C_4$ | no fracture | 8.9 |

*Comparative Examples

TABLE 3

| Example No. | Component [% by weight] A | B | C | Rubber D [% by weight] | Water absorption[1] according to DIN 53,453 kJm$^{-2}$ | Notched impact strength according to DIN 53,453 kJm$^{-2}$ |
| --- | --- | --- | --- | --- | --- | --- |
| 26* | 40.0 | 60.0 B$_4$ | — | — | 1.7 | 0.9 |
| 27 | 36.4 | 54.5 B$_4$ | 9.1 C$_5$ | — | 0.9 | 3.7 |
| 28 | 39.1 | 47.8 B$_4$ | 13.1 C$_5$ | — | 0.8 | 4.3 |
| 29 | 30.8 | 46.1 B$_4$ | 23.1 C$_5$ | | 0.7 | 4.1 |
| 30 | 32.0 | 48.0 B$_4$ | 12.0 C$_5$ | 8.0 | 0.8 | 12.1 |
| 31* | 36.4 | 54.6 B$_4$ | — | 9.0 | 1.4 | 2.0 |
| 32 | 13.8 | 55.2 B$_5$ | 20.7 C$_5$ | 10.3 | 0.7 | 14.1 |
| 33 | 53.8 | 23.1 B$_5$ | 15.4 C$_5$ | 7.7 | 0.4 | 8.0 |
| 34 | 46.2 | 37.8 B$_5$ | 4.2 C$_5$ | 11.8 | 0.8 | 8.4 |
| 35 | 8.1 | 72.6 B$_5$ | 8.1 C$_5$ | 11.2 | 1.3 | 11.1 |

*Comparative Examples
[1]To determine the water absorption, the granulated mixtures (mean particle size 3 mm) were dried at 80° C. for 4 days under reduced pressure and then stored at 23° C. and 65% relative humidity for 40 days, after which the percentage increase in weight was determined The results show that the molding materials according to the invention and the moldings prepared from them have a low water absorption and good notched impact strength.

We claim:

1. A thermoplastic molding material comprising:
   (A) not less than 5% by weight of polyphenylene ether,
   (B) not less than 5% by weight of a nylon, and
   (C) not less than 0.1% by weight of a rubber-free copolymer composed of
   (C$_1$) from 80 to 99.95% by weight of a styrene of the formula

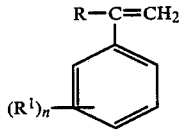

wherein R and R$^1$ are alkyl of 1 to 8 carbon atoms, hydrogen, halogen, or mixtures thereof, and n is 0, 1, 2 or 3,
   (C$_3$) from 0.05 to 20% by weight of a halobenzyl-containing monomer copolymerizable with C$_1$, and possessing the structural unit

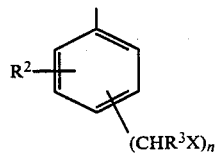

where X is halogen, R$^2$ and R$^3$ are each alkyl of 1 to 8 carbon atoms or hydrogen, and n is 1, 2 or 3, and
   (C$_5$) from 0 to 10% by weight of acrylonitrile, methacrylonitrile or a mixture thereof, and
   (D) from 0 to 35% by weight of a an impact-modifying rubber.

2. A thermoplastic molding material as claimed in claim 1, wherein the polyphenylene ether A contains up to 50% by weight of a styrene polymer selected from the group consisting of polystyrene, poly-α-methylstyrene and poly-p-methylstyrene.

3. A thermoplastic molding material as claimed in claim 1, wherein copolymer C has a molecular weight M$_w$ of from 20,000 to 1,000,000.

4. A thermoplastic molding material as claimed in claim 1, wherein component 0 is a block copolymer of styrene and butadiene and is present in an amount of from 4 to 20% by weight.

5. Moldings containing a molding material as claimed in claim 1 as the essential component.

* * * * *